(12) United States Patent
Winter et al.

(10) Patent No.: US 7,197,237 B1
(45) Date of Patent: Mar. 27, 2007

(54) METHOD FOR TRANSFERRING REAL-TIME FILES

(75) Inventors: Marco Winter, Hannover (DE); Harald Schiller, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/914,683

(22) PCT Filed: Feb. 21, 2000

(86) PCT No.: PCT/EP00/01414

§ 371 (c)(1),
(2), (4) Date: Aug. 31, 2001

(87) PCT Pub. No.: WO00/52689

PCT Pub. Date: Sep. 8, 2000

(30) Foreign Application Priority Data

Mar. 3, 1999 (DE) ................................ 199 09 367

(51) Int. Cl.
*H04N 5/00* (2006.01)
(52) U.S. Cl. ................ 386/125; 386/126; 386/33; 386/111; 386/112
(58) Field of Classification Search ............... 386/33, 386/111–112, 125–126
See application file for complete search history.

(56) References Cited

U.S. PATENT DOCUMENTS

| | | | | |
|---|---|---|---|---|
| 5,414,686 A | * | 5/1995 | Iitsuka | ............ 369/47.29 |
| 5,943,391 A | * | 8/1999 | Nordling | ............ 379/1.03 |
| 6,711,343 B1 | * | 3/2004 | Matsumi et al. | ............ 386/46 |
| 6,711,843 B2 | * | 3/2004 | Klebes | ............ 42/70.11 |
| 2006/0093336 A1 | * | 5/2006 | Gotoh et al. | ............ 386/125 |

FOREIGN PATENT DOCUMENTS

| | | |
|---|---|---|
| EP | 737 975 A2 | 10/1996 |
| EP | 866 456 A1 | 9/1998 |
| EP | 0953977 A1 * | 4/1999 |
| EP | 953 977 A1 | 11/1999 |

* cited by examiner

*Primary Examiner*—Thai Q. Tran
*Assistant Examiner*—Helen Shibru
(74) *Attorney, Agent, or Firm*—Joseph J. Laks; Robert B. Levy; Jorge Tony Villabon

(57) ABSTRACT

The recording or reproduction of real-time files (RF) imposes certain requirements on the recording and reproduction means. A DVD-RAM drive, for example, can read and write contiguous sectors rapidly, but requires a relatively long time in the event of jumps to other sectors, with the result that the recorded data should be situated in sectors which are as far as possible contiguous. The invention is based on the object of specifying a method for transferring real-time files in which even after a transfer of a real-time file from a first to a second recording medium, a real-time reproduction of this file is possible. According to the method of the invention, for this purpose real-time file attributes (RFA) which are permanently assigned to a real-time file (RF) and are concomitantly transferred during the transfer of the real-time file are provided for classifying the real-time file, it being possible to utilize the classification to ensure that the real-time properties of the real-time file are preserved during a recording process.

7 Claims, 1 Drawing Sheet

METHOD FOR TRANSFERRING REAL-TIME FILES

This application claims the benefit under 35 U.S.C. § 365 of International Application PCT/EP00/01414, filed Feb. 21, 2000, which claims the benefit of German Patent Application No. 199 09 367.9, filed Mar. 3, 1999.

The invention relates to a method for transferring real-time files, for example for recording and/or reproduction by a DVD-RAM drive.

PRIOR ART

Real-time files contain data such as video and audio signals which are recorded or reproduced in real time, called real-time data below. In this case, the real-time property gives rise to requirements made of the recording and reproduction means. A DVD-RAM drive, for example, can read and write contiguous sectors rapidly. However, it requires a relatively long time in the event of jumps to other sectors. Therefore, in the case of a DVD-RAM drive, the recorded data should be situated in sectors that are as far as possible contiguous, in order to keep the number of jumps of the read-out mechanism as small as possible.

In this case, the requirements made of the recording means also depend on the real-time application, that is to say every real-time application may impose different conditions on the real-time recording of its real-time files.

INVENTION

The invention is based on the object of specifying a method for transferring real-time files in which even after a transfer of a real-time file from a first to a second recording medium, a real-time reproduction of this real-time file is possible. This object is achieved by means of the method specified in claim 1.

The invention is based on the insight that, for the transfer of real-time files to another medium, it is very useful to provide a general prescription with which a file manager, without knowing the real-time application itself, by means of attributes permanently assigned to the real-time file, can derive the rules for recording the real-time file. For this purpose, the file manager should know the recording properties of the destination recording means (e.g. guaranteed transfer rate, guaranteed access time, guaranteed jump times, etc.). Furthermore, owing to the existing diversity of recording means (tape, HDD, CD, DVD, etc.), the real-time file attributes should be independent of the recording means used.

In principle, the invention's method for transferring real-time files containing real-time data consists, therefore, in the fact that real-time file attributes which are permanently assigned to a real-time file and are concomitantly transferred during the transfer of the real-time file are provided for classifying the real-time file, it being possible to utilize the classification to ensure that the real-time properties of the real-time file are preserved during a recording process.

This method is particularly advantageous if the transfer of the real-time file is followed by a recording or a reproduction of the real-time file.

Preferably, at least the following real-time file attributes are provided:
a) the guaranteed minimum transfer rate during the real-time file transfer,
b) the maximum transfer rate during the real-time file transfer,
c) the size of the buffer store, and a version number may be provided as a further real-time file attribute.

It is advantageous, moreover, if the real-time file attributes are combined in a data block and such a data block is assigned to a real-time file.

It is particularly advantageous in this case if the data block is stored in UDF as Extended Attribute in a File Entry or in a System Stream assigned to the real-time file, or if the real-time file is assigned a fixed area in the useful data area for the real-time file attributes.

Finally, the real-time file attributes may preferably be contained in an MPEG private_stream.

DRAWINGS

Exemplary embodiments of the invention are described with reference to the figures.

EXEMPLARY EMBODIMENTS

Figure 1:
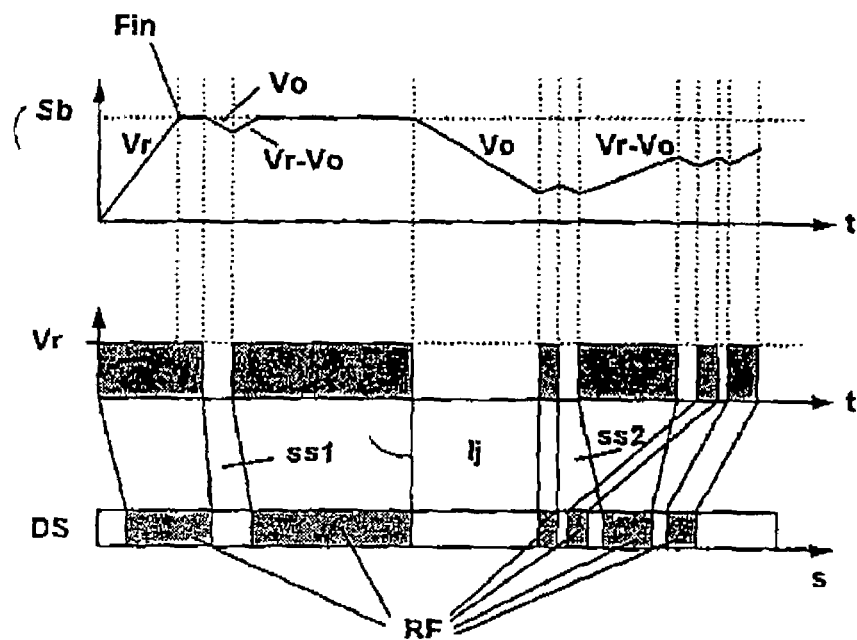
FIG. 1 shows a distribution of the real-time file between various sectors of an optical disc with transfer rate and buffer store contents during the real-time data transfer.

FIG. 1 illustrates an exemplary transfer of a real-time file RF, which is distributed between various sectors s of an optical disc DS. What may be involved here, by way of example, is a DVD-RAM with a storage capacity of 2.6 Gbytes; the real-time file attributes may have the following values:

a) Minimum transfer rate Vo=8 Mbit/s;
b) Maximum transfer rate during the real-time file transfer Vr=16 Mbit/s;
c) Size of the buffer store $S_b$=1 Mbyte.

The transfer of the real-time data at the maximum transfer bit rate Vr is interrupted in this case by short skips ss1, ss2 and a long jump 1j. The track buffer is filled at the beginning of the transfer at the maximum transfer bit rate Vr, until the maximum track buffer size Sb is reached at the instant Fin. In the event of the first short skip ss1, the occupancy of the track buffer is then reduced, since read-out is effected merely at Vo. After the end of the first short skip ss1, read-out continues to be effected at Vo, but at the same time read-in is also effected at the maximum transfer bit rate Vr, with the result that the occupancy of the track buffer increases again at Vr–Vo. The occupancy is then equally altered in the event of the long jump 1j and the short skip ss2. The division of the real-time file thus fulfils the conditions for the real-time files, since a transfer rate of Vo takes place over the entire real-time file transfer and, nevertheless, at no point in time does an underflow of the track buffer occur.

The rules for the recording of a real-time file with the real-time properties being maintained are thus:
1. The guaranteed minimum transfer rate during the real-time file transfer is Vo
2. The maximum transfer rate during the real-time file transfer is Vr
3. After initial filling of the track buffer of the size $S_b$ at the beginning of the transfer of the real-time file, no underflow of the track buffer is permitted to occur during the transfer of the real-time file With these rules and knowledge of the destination recording apparatus, the file manager is able to allocate memory on the destination medium in such a way that the real-time property of the real-time file is ensured. What is also important here in the context of choosing the parameters Vo, Vr and $S_b$ is that they are either more stringent or just as stringent as the real-time requirement of the original application.

The real-time file attributes for describing the hardware-independent real-time property of the real-time file may in this case have the following format, for example:

|  | Contents | Unit | Bytes |
|---|---|---|---|
| VER | Version of the real-time file attributes = 1 (Version 1.0) |  | 2 |
| Vo | Bit rate for the application which must at least be supported (maximum bit rate respectively required by the application) | bits per sec. | 8 |
| Vr | Maximum transfer bit rate | bits per sec. | 8 |
| $S_b$ | Track buffer size | byte | 4 |

Other resolutions of the real-time file attributes would also be conceivable, such as e.g.:

|  | Contents | Unit | Bytes |
|---|---|---|---|
| VER | Version of the real-time file attributes = 1 (Version 1.0) |  | 2 |
| Vo | Bit rate for the application which must at least be supported (maximum bit rate respectively required by the application) | kbits per sec. | 4 |
| Vr | Maximum transfer bit rate | kbits per sec. | 4 |
| $S_b$ | Track buffer size | kbyte | 4 |

In this exemplary embodiment, the real-time file attributes may be stored under UDF e.g. as UDF System Stream.

Figure 2:
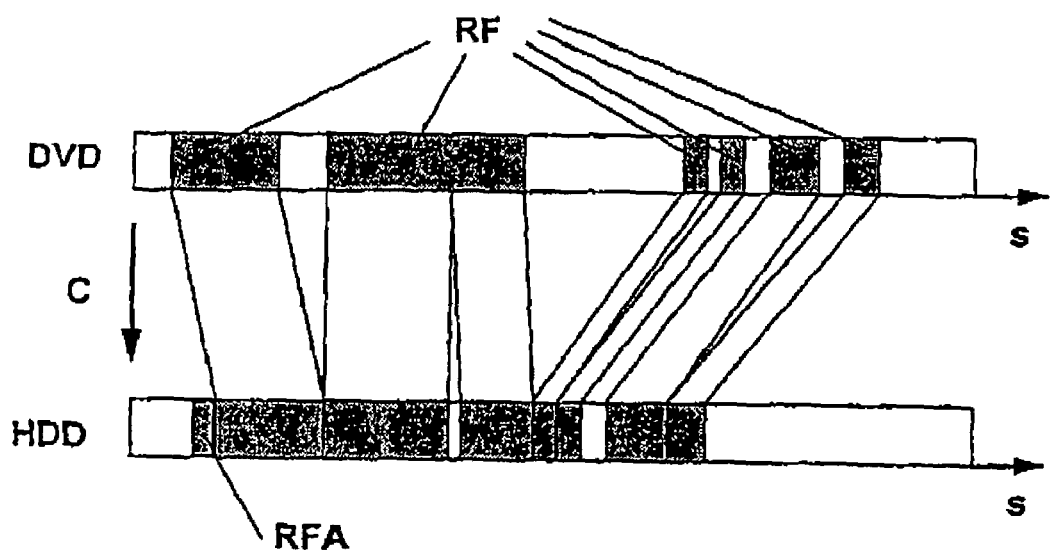
FIG. 2 shows a distribution of the real-time file between various sectors of an optical disc and of a hard disk after real-time-preserving copying.

FIG. 2 diagrammatically illustrates the real-time-preserving copying C for file systems which do not provide storage space permanently assigned to the file for e.g. real-time file attributes. A real-time file RF is in this case copied from a digital video disc DVD to an MS DOS 6.2 hard disk partition HDD. Since no file attributes are provided under MS DOS 6.2, the data are placed in a data block RFA with a size of 2048 bytes at the start of the real-time file, that is to say the real-time file increases in size by 2048 bytes. As a result, the file attributes are assigned to the real-time file, so that the real-time file attributes are always concomitantly copied even in the case of a Copy Command.

In this case, the copying can be effected with the aid of a personal computer file manager, e.g. an RTRW real-time file being coped from a DVD-RAM 2.6 Gbyte drive to an internal hard disk. The intention is for the real-time file to be able to be read in real time and written in real time on the hard disk. For this purpose, the file manager must know a number of properties of the HDD, that is to say how rapidly contiguous sectors can be read, how long a jump to another sector takes, etc. By means of the real-time file attributes, the file manager can then derive the way in which the HDD storage space that is still free can be allocated in order that the real-time requirements made of the real-time file are fulfilled.

The real-time file attributes can be inserted into the real-time file in e.g. the following format:

|  | Contents | Unit | Bytes |
|---|---|---|---|
| RT_ATTR_SEC_ID | Identification bytes for identifying the real-time file attributes | — | 24 |
| RT_ATTR_ID | Identification bytes for indicating valid real-time file attributes: ASCII text: "REALTIMEATTR" | — | 12 |
| RT_ATTR_SZ | Number of subsequent real-time file attributes | byte | 4 |
| VER | Version of the real-time file attributes = 1 (Version 1.0) |  | 2 |
| Vo | Bit rate for the application which must at least be supported (maximum bit rate respectively required by the application) | bits per sec. | 8 |
| Vr | Maximum transfer bit rate | bits per sec. | 8 |
| $S_b$ | Track buffer size | byte | 4 |
| Reserved | Reserved |  | 1986 |

RT_ATTR_SEC_ID contains the information—customary in DVD—of a Pack header (14 bytes) and the information of a minimal Packet Header. That is expedient for achieving storage of the real-time file attributes which is as DVD-compatible as possible. The actual data shall then be declared as MPEG private_stream_1.

RT_ATTR_ID is a further identifier for ensuring that this private_stream contains real-time file attributes.

RT_ATTR_SZ specifies the number of subsequent bytes belonging to the real-time file attributes. If more than 2008 bytes follow for subsequent applications, then the remaining real-time file attributes are distributed between the subsequent sectors, in each case after the first 36 bytes of a sector. The first 36 bytes of the real-time file attribute sectors have identical contents.

The first 2048 bytes of the real-time file have e.g. the following contents:

| Contents | Bytes |
|---|---|
| DVD pack header (see DVD Book, part 3, Version 1.0): SCR = 0; packet header: stream_id = private_stream_1, PES_packet_length = 4, PTS_DTS_flag = 00, no PES extension sub_stream_id = 255 | 24 |
| ASCII Text: "REALTIMEATTR" | 12 |
| Number of subsequent real-time file attributes = 22 | 4 |
| Version of the real-time file attributes = 1 (Version 1.0) | 2 |
| Bit rate for the application which must at least be supported = 8 Mbit/s | 8 |
| Maximum transfer bit rate = 16 Mbits/s | 8 |
| Track buffer size = 1 Mbyte | 4 |
| Reserved (all bytes to 0) | 1986 |

The subsequent bytes of the transferred file then contain the data of the original real-time file.

A real-time file can be transferred between a wide variety of recording/reproduction apparatuses such as, for example, CD or DVD-RAM drives or hard disks. Moreover, it is possible, for instance, to copy a real-time file from a DVD-RAM drive to a tape without the real-time property of the real-time file being lost.

The invention claimed is:

1. Method for recording real-time files containing real-time data, comprising: permanently assigning real-time file attributes to the real-time files and concomitantly recording the real-time file attributes together with the real-time files, the real-time file attributes describing hardware independent real-time requirements of the real-time files during a real-time file transfer for playback of the real-time files wherein at least the following real-time file attributes are provided:
   a) a guaranteed minimum transfer rate during the real-time file transfer,
   b) a maximum transfer rate during the real-time file transfer,
   c) a buffer store size used during the real-time file transfer, and
   deriving rules for recording the real-time files from the real-time file attributes in order to ensure that the real-time properties of the real-time files are preserved during the recording process.

2. Method according to claim 1, wherein for a fragmented recording of the real-time files the sizes of the file fragments and the distances between the file fragments are chosen in such a way that the real-time file transfer can be performed with the guaranteed minimum transfer rate during the entire real-time file transfer without any underflow of the buffer store.

3. Method according to claim 1 wherein a version number is provided as a further real-time file attribute.

4. Method according to claim 1, wherein the real-time file attributes are combined in a data block and such a data block is assigned to a real-time file.

5. Method according to claim 4, wherein the data block is stored in UDF as Extended Attribute in a File Entry or in a System Stream assigned to the real-time file.

6. Method according to claim 4, wherein the real-time file is assigned a fixed area in the useful data area for the real-time file attributes.

7. Method according to claim 6, wherein the real-time file attributes are contained in an MPEG private_stream.

* * * * *